3,173,832
PARAFORMALDEHYDE STABILIZED
FUNGICIDAL COMPOSITIONS
John M. Harris, Wilmington, Del., assignor to E. I. du Pont de Nemours and Company, Wilmington, Del., a corporation of Delaware
No Drawing. Filed June 9, 1961, Ser. No. 115,921
4 Claims. (Cl. 167—22)

This invention relates to the stabilization of fungicidal compositions containing manganese ethylenebisdithiocarbamate or zinc ethylenebisdithiocarbamate as the active fungicidal ingredient.

The use of manganese ethylenebisdithiocarbamate as a fungicide, and fungicidal compositions containing this compound, are known. See, for example, Flenner United States Patent No. 2,504,404, issued April 18, 1950, the entire disclosure of which is hereby incorporated by reference.

Similarly, the use of zinc ethylenebisdithiocarbamate as a fungicide, and fungicidal compositions containing this compound, are also known. See, for example, Hester United States Patent No. 2,317,765, issued April 27, 1943, and Reissue Patent No. 23,742, reissued November 24, 1953, the entire disclosure of both of which is hereby incorporated by reference.

It is also known that manganese ethylenebisdithiocarbamate or zinc ethylenebisdithiocarbamate, and fungicidal compositions containing either of these compounds, are characterized by less than complete stability. The active fungicidal ingredient may decompose, especially when stored for long periods of time or when subjected to hot weather or storage at high temperatures. This instability may result in objectionable odor, discoloration of the composition, decrease of fungicidal effectiveness, or the like.

According to the present invention, manganese ethylenebisdithiocarbamate or zinc ethylenebisdithiocarbamate, and fungicidal compositions containing either of these compounds, are stabilized against decomposition by including with the ethylenebisdithiocarbamate or ethylenebisdithiocarbamate fungicidal compositions a stabilizing amount of paraformaldehyde.

It will be understood that even a very small amount of paraformaldehyde will exert some stabilizing effect on the dithiocarbamate compound. Ordinarily, the paraformaldehyde will be used in an amount between about 0.2 and 5.0% by weight, based on the total weight of the composition. Preferably, from 0.5 to 2.0% will be used. Use of too high a level of paraformaldehyde may solve the stability problem but introduce a different problem, since the paraformaldehyde odor becomes rather strong at high levels.

Conventional ingredients in fungicidal compositions, such as disclosed in the aforementioned Flenner and Hester patents, can of course be present in the stabilized compositions of this invention. The paraformaldehyde can be admixed with these other components by simple blending or mixing, as will be readily understood in the art.

An advantage of this invention is that commercially available paraformaldehyde can be used with excellent results. Any of the commercially available forms, such as powder, flakes and granules, can be used, as well as other solid or liquid forms.

The paraformaldehyde can be admixed with the manganese or zinc ethylenebisdithiocarbamate during the preparation of the fungicide. It is preferred to blend the paraformaldehyde in with the other ingredients of the formulation during preparation of the latter.

Among the other components of a fungicidal composition according to this invention can be mentioned those of the above-mentioned Flenner and Hester patents incorporated herein by reference. Suitable components include finely divided solids, a wetting, dispersing, or emulsifying agent, as well as other fungicidal and bactericidal agents or insect toxicants.

As in the compositions disclosed, respectively, by Flenner and Hester, the formulation can conveniently be a water-dispersible composition containing from 60 to 95% by weight of manganese or zinc ethylenebisdithiocarbamate as active ingredient, from 0.2% to 5% by weight of paraformaldehyde, and the remainder a chemically inert free-flowing finely divided water-dispersible solid powder together with a wetting or dispersing agent, such that the formulation is readily dispersed or suspended in water for fungicidal application.

Advantageous results are also obtained with compositions comprising the manganese or zinc ethylenebisdithiocarbamate in a typical amount from about 2–15%, and the remainder a dusting diluent, such as clays, talc, and the like. Such dust compositions are stabilized with paraformaldehyde according to the present invention. While about 0.25% is a preferred amount of paraformaldehyde, lesser amounts, say 0.1% to 0.25% based on the total composition, can be used. Such lesser amounts can be used particularly where a relatively concentrated fungicide composition containing for example 80% of the dithiocarbamate and 2% of the paraformaldehyde is blended with additional diluent to form the dust.

In a separate aspect, it has been discovered that the phytotoxicity of manganese ethylenebisdithiocarbamate can be reduced by including in manganese ethylenebisdithiocarbamate fungicidal compositions a small amount of water-soluble zinc or cadimum ions. These metal ions can be conveniently introduced as water-soluble salts, such as the sulfate, chloride, iodide, bromide, nitrate and acetate, and reduction of the phytotoxicity is obtained by the presence of from 0.25 to 5 mole percent of metal ion per mole of manganese ethylenebisdithiocarbamate. This discovery is disclosed in further detail and claimed in Luginbuhl U.S. Patent 3,085,042, issued April 9, 1963.

It will therefore be understood that a preferred fungicidal composition of particularly outstanding utility, characterized by excellent stability and low phytotoxicity, comprises manganese ethylenebisdithiocarbamate as the active fungicidal ingredient, paraformaldehyde as a stabilizer, and water-soluble zinc or cadmium ions for reduction of phytotoxicity.

This invention will be better understood by reference to the following and illustrative examples:

*Example I*

A preparation of manganese ethylenebisdithiocarbamate is dry blended with 3% by weight of paraformaldehyde. This formulation, upon subjection to an accelerated storage stability test, is found to be remarkably stable for extended periods of time. When this composition is dispersed in water in the amount of 1–2 pounds per one hundred gallons of water and applied as a spray to tomato plants, it is found to be very effective in the control of early blight (*Alternaria solani*) and late blight (*Phytophthoria infestans*).

*Example II*

Manganese ethylenebisdithiocarbamate is dry blended with 1% by weight of paraformaldehyde, 1.5% by weight of methyl ether of cellulose ("Methocel" 15), 1% by weight of sodium lignin sulfonate, and 0.5% by weight of an alkylnaphthalene sodium sulfonate ("Alkanol B"). This formulation is ground and subjected to an accelerated storage stability test. It is found to be remarkably stable for extended periods of time. This formulation is very effective as a fungicide when tested, even after an extended period of time, on tomato plants in the manner described in Example I.

*Example III*

Manganese ethylenebisdithiocarbamate is dry blended with 1% by weight of paraformaldehyde, 1.25% by weight of zinc sulfate monohydrate, 0.25% by weight of methyl ether of cellulose, 1% by weight of sodium lignin sulfonate, and 0.5% by weight of alkylnaphthalene sodium sulfonate. The composition is ground and then subjected to accelerated storage stability testing. It is found to be remarkably stable for extended periods of time. This composition is found to be very effective as a fungicide when tested, even after an extended period of time, on tomato plants in the manner described in Example I.

*Example IV*

A sample of manganese ethylenebisdithiocarbamate is washed with a 2% solution of paraformaldehyde in water. After drying, the dithiocarbamate containing about 0.75% by weight of paraformaldehyde is dry blended and ground as in Example II. Stabilization and fungicidal testing as in that example give equally excellent results.

*Example V*

Zinc ethylenebisdithiocarbamate is blended with 5% by weight of paraformaldehyde, and the resulting composition compared with a portion of the original sample without paraformaldehyde in an elevated temperature accelerated storage stability test. After three weeks in storage, it is found that 47% of the original zinc compound present in the sample without paraformaldehyde has decomposed while only 16% of the zinc compound in the sample with paraformaldehyde has decomposed. The composition of this invention continues to be satisfactory in fungicidal effectiveness.

*Example VI*

Example V is repeated with the addition of 1% by weight of methyl ether of cellulose to the composition, with similar outstandingly satisfactory results.

The above examples can be repeated by substituting different amounts of the essential components within the scope of this invention, as well as other adjuvants, carriers, conditioning agents and the like, with equally satisfactory results, as will be readily understood. The examples are intended merely for purposes of illustration.

The invention claimed is:

1. A fungicidal composition comprising 0.2 to 5.0% by weight paraformaldehyde and a fungicidally effective amount of a compound selected from the group consisting of the manganese and zinc salts of ethylenebisdithiocarbamic acid.

2. A water-dispersible powder comprising from 60 to 95% by weight of manganese ethylenebisdithiocarbamate, from 0.2 to 5.0% by weight of paraformaldehyde, and a finely divided inert powder.

3. A water-dispersible powder comprising from 60 to 95% by weight of zinc ethylenebisdithiocarbamate, from 0.2 to 5% by weight of paraformaldehyde, and a finely divided inert powder.

4. A fungicidal composition comprising a mixture of manganese ethylenebisdithiocarbamate and zinc ethylenebisdithiocarbamate, and from 0.2 to 5% by weight of paraformaldehyde based on the total weight of said composition.

References Cited in the file of this patent

UNITED STATES PATENTS

| | | |
|---|---|---|
| 2,317,765 | Hester | Apr. 27, 1943 |
| 2,504,404 | Flenner | Apr. 18, 1950 |

OTHER REFERENCES

Frear, A.: Catalogue of Insecticides and Fungicides, vol. 2, page 37, 1948.